Sept. 20, 1966  F. N. MASTRUP  3,274,437
HIGH INTENSITY RADIANT ENERGY SOURCE
Filed Nov. 20, 1963  4 Sheets-Sheet 1
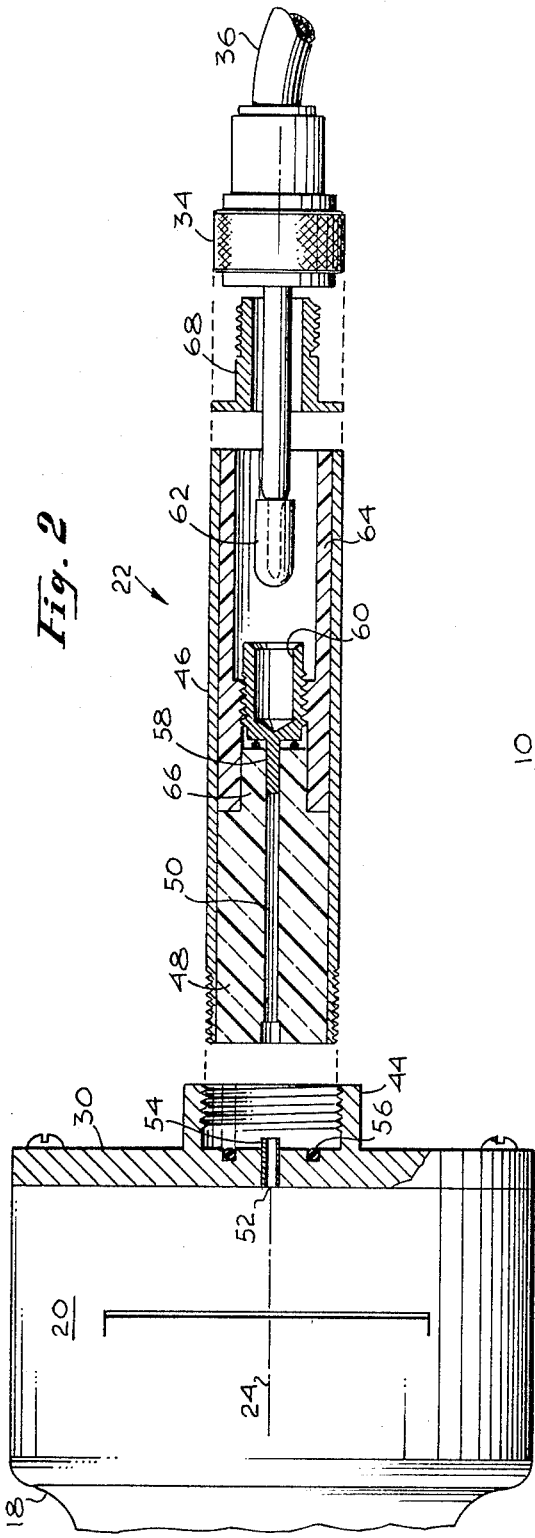
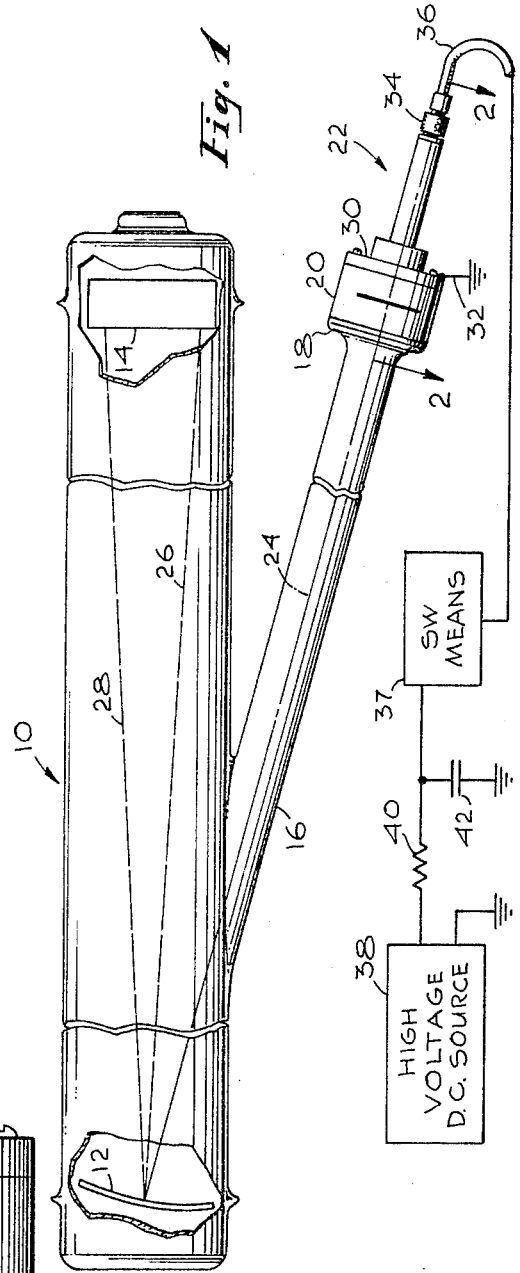
FRITHJOF N. MASTRUP
INVENTOR.
BY
ATTORNEY

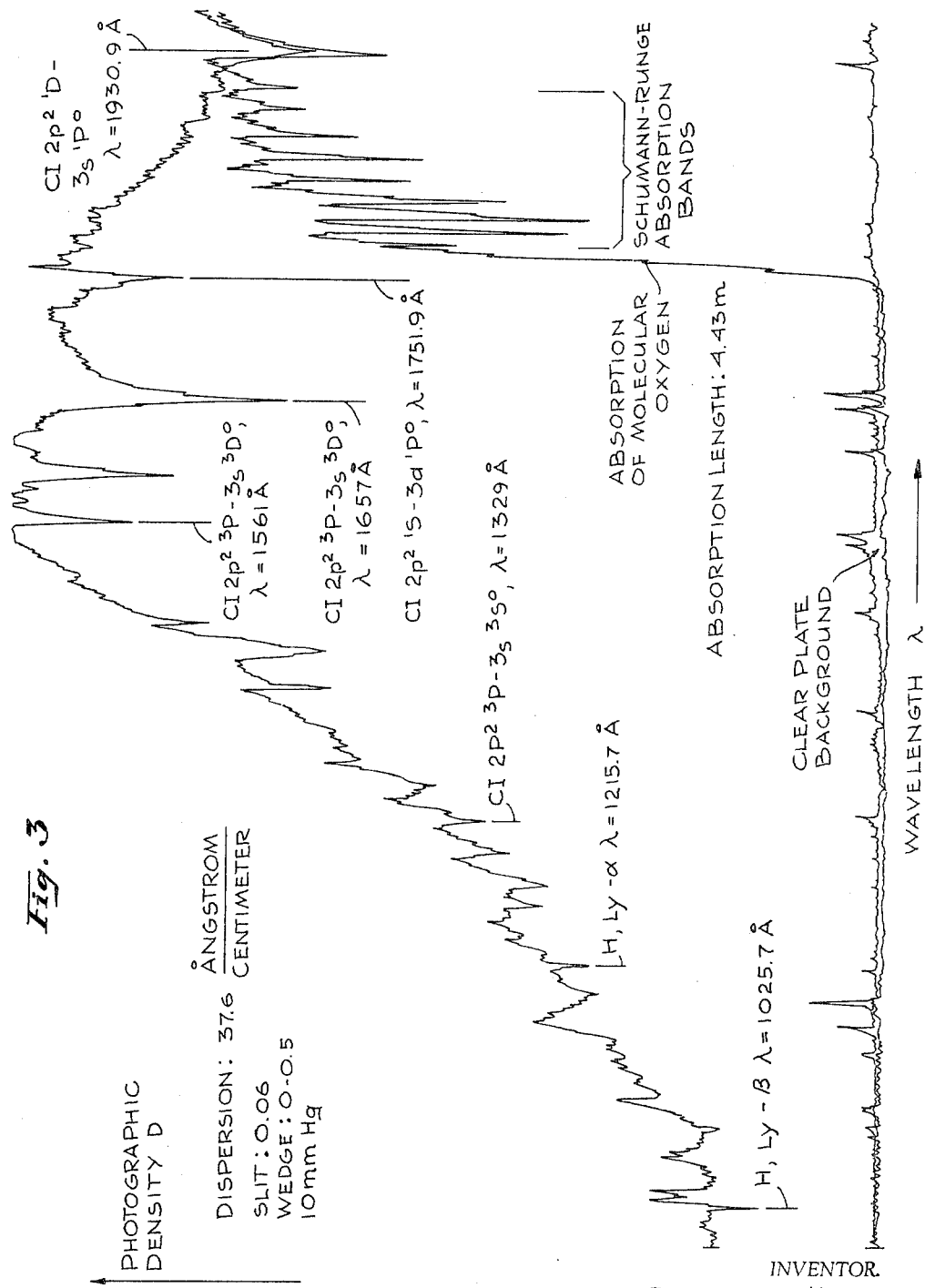

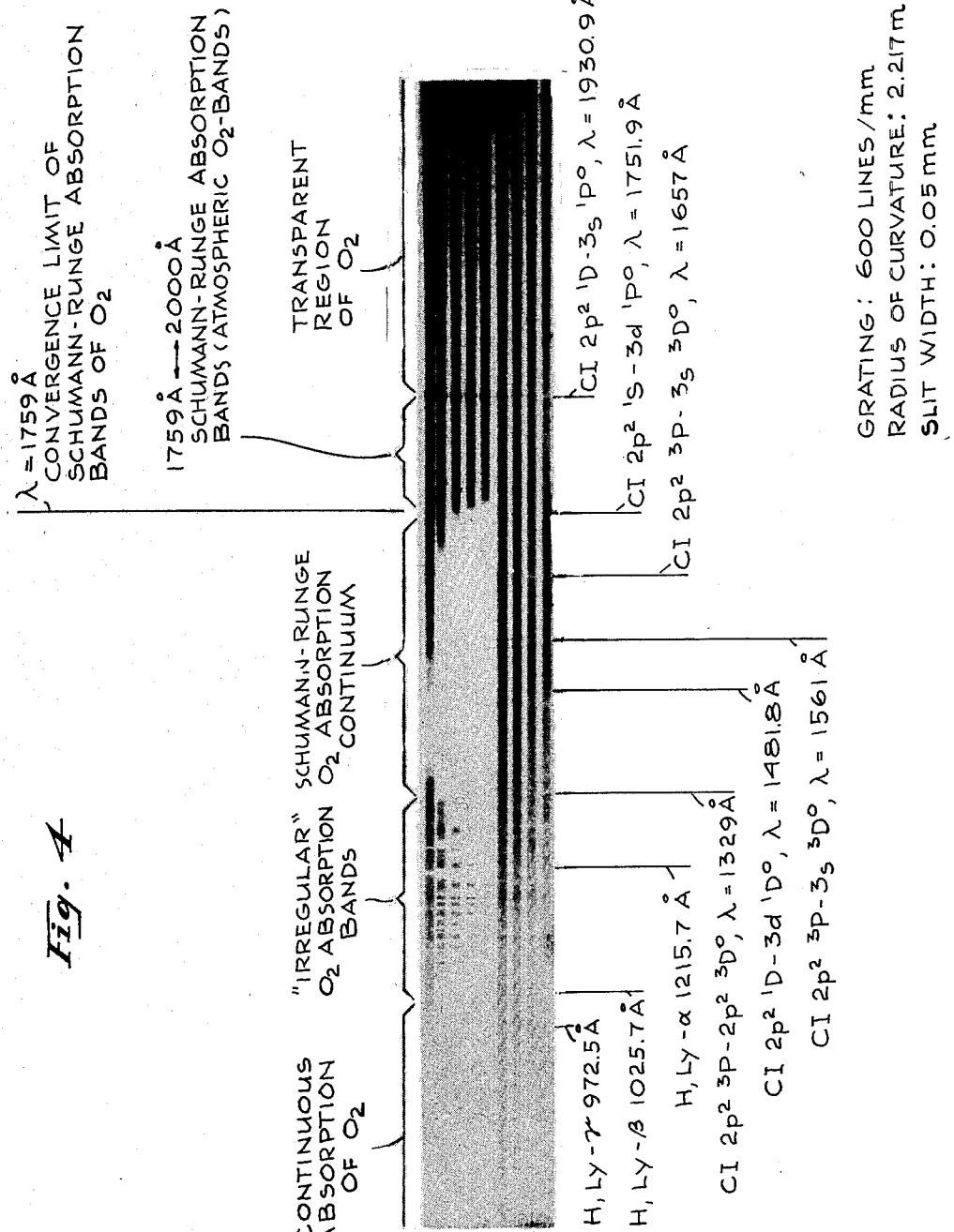

Sept. 20, 1966  F. N. MASTRUP  3,274,437
HIGH INTENSITY RADIANT ENERGY SOURCE
Filed Nov. 20, 1963  4 Sheets-Sheet 4
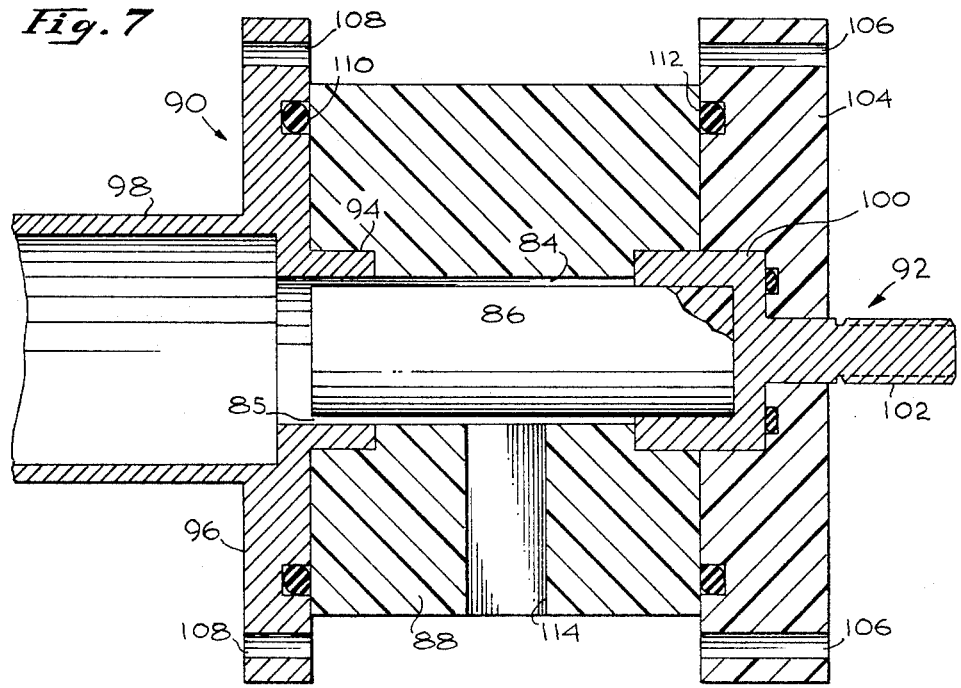
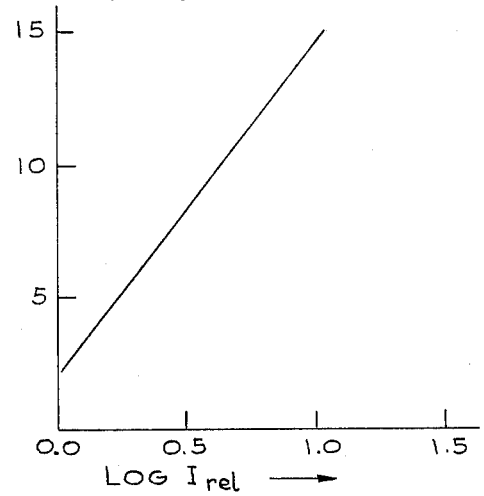
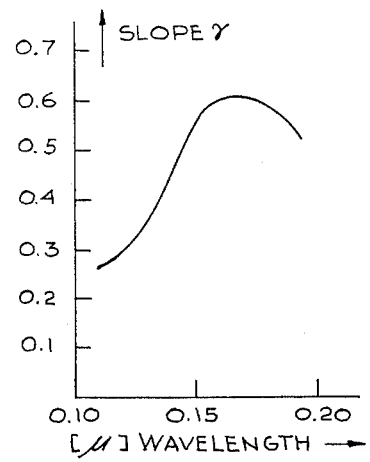
INVENTOR.
FRITHJOF N. MASTRUP
BY
ATTORNEY 3,274,437
HIGH INTENSITY RADIANT ENERGY SOURCE
Frithjof N. Mastrup, Manhattan Beach, Calif., assignor to Thompson Ramo Wooldridge Inc., Redondo Beach, Calif., a corporation of Ohio
Filed Nov. 20, 1963, Ser. No. 325,084
8 Claims. (Cl. 315—111)

The present invention relates to improvements in apparatus for applying electrical energy to generate optical frequency radiation and more particularly to an electrically energized plasma discharge device which is useful as a source of high intensity radiation in the infrared visible, ultraviolet and vacuum ultraviolet regions of the electromagnetic spectrum.

The apparatus of the present invention is useful as a high intensity flashing light source having general application in various fields of art for generating infrared visible, ultraviolet and vacuum ultraviolet radiation. For convenience and clarity of exposition the invention is hereafter described with reference to a particular embodiment which has been found most suitable for spectroscopic studies in the optical frequency wavelength region using spectrographic apparatus of the type commonly used for research involving radiation in the above mentioned frequency range. It is, of course, to be understood that the invention may have broad application for a variety of other end purposes and its application is not restricted to the particular uses described hereinafter or to any particular wavelength range.

In the field of spectrographic research as well as in the many other fields, it has been heretofore extremely difficult to provide high intensity light sources which emit a continuous spectrum across a broad wavelength range without excessive energy peaks corresponding to discrete spectral lines. This is particularly true for the vacuum ultraviolet spatial range which is generally understood to mean the wavelength range below 2000 Angstroms. In addition, many factors limit the efficiency, maximum radiation power and total radiation energy output of thermal radiator light sources as they have been known heretofore. The best practical high power light sources heretofore available have utilized radiating plasmas. A thermally radiating plasma desirably should approach black body radiation characteristics in order to achieve the maximum radiation power output compatible with a given temperature. With many types of gas discharge lamps, black body conditions cannot be obtained at practical parameters of pressure and temperature. In the latter cases the radiant energy consists of a large degree of line emissions rather than the desired continuum across the wavelength range of interest.

It has long been known that short duration high potential electrical discharges through gas filled tubes at high pressures (from a few atmospheres to several hundred atmospheres) are the most powerful practical light sources known other than atomic explosions. For example, it has been shown heretofore that helium at about 400 atmospheres of pressure in a discharge tube which is energized at about 30 kilovolts from charged capacitors can provide radiation corresponding to that which would be emitted by a black body having a surface temperature approaching 300,000° Kelvin. One such apparatus is disclosed in my copending application Ser. No. 139,731 filed September 21, 1961, which application is assigned to the same assignee as that of the present invention. Unfortunately, most such high pressure discharge devices have a number of disadvantages. As a general rule, such devices provide a point source of radiation whereas many applications demand a source which radiates from an extended area. Secondly, all such high pressure discharge devices inherently require that the radiation emerge through a high strength optical window. Most radiation transmissive materials which have suitable strength for such devices are highly attenuative at wavelengths shorter than about 2000 Angstroms. Sapphire, which has both excellent mechanical strength and transparency at wavelengths down to approximately 1550 A. is expensive and does not lend itself readily to production of complicated shapes. LiF (lithium fluoride) and CaF (calcium fluoride), although transparent down to approximately 1200 Angstroms have very poor mechanical strength. For transmission of radiation of wavelength substantially less than 1200 Angstroms no suitable material is known. It is also necessary to remove air or other absorbing gases from the spatial regions traversed by the radiation.

Thus, as a practical matter, where it is desired to generate intense radiation across a spectral range extending to wavelengths substantially shorter than about 2000 Angstroms, it is necessary that the light source be capable of operating in a vacuum so that the radiation can be transmitted from the source to a vacuum spectrographic apparatus without passing through optical windows.

Accordingly, it is object of the present invention to provide a high temperature plasma light source capable of producing in the vacuum ultraviolet region, usable radiation intensities higher than the devices heretofore known.

It is a further object of the present invention to provide a radiation source of long life having a spectral energy distribution approximately corresponding to that of a black body having a temperature of the order of 20,000° Kelvin.

It is an additional object of the present invention to provide a plasma discharge radiation source which is capable of producing an intense continuum across a wavelength range from about 800 Angstroms to at least 6000 Angstroms.

It is a still further object of the present invention to provide a light source of the type described capable of producing successive short duration output pulses which vary in maximum intensity by less than about ±10%.

It is another object of the present invention to provide a radiation source of the type described which can be operated in a vacuum without requiring transmission of the output radiation through attenuative optical windows.

It is another object of the present invention to provide an intense radiation source which can be ignited and operated merely by applying a sufficiently high potential difference between the electrodes and in which no gas or gas feed system is required for the operation of the source at any time during the operating cycle.

In accordance with the preferred embodiment of the present invention, the foregoing objects and purposes are accomplished by an apparatus which comprises essentially a pair of spaced electrodes between which there extends an arc discharge passageway peripherally enclosed by a substantially cylindrical member of suitable insulating material. The active ends of the electrodes are disposed closely adjacent the insulating walls of the arc discharge passageway so that when a high potential is applied across the electrodes, a sliding spark along the passageway wall initiates an arc discharge through the passageway. According to the principal concepts of the present invention, the insulating member which peripherally defines the arc discharge passageway includes an electric arc responsive substance which is particularly characterized in that it is capable of evolving large quantities of gas when subjected to a contiguous arc discharge. The sliding spark along the passageway wall evolves a sufficient quantity of gas within the discharge passageway so that a high current arc discharge can occur through that gas to additionally heat the same. Such heating causes the passageway wall surfaces to evolve additional gas until a high pressure, high temperature plasma exists within the arc passageway which radiates nearly as a black body of the plasma temperature. All of the foregoing occurs in a time of the order of 0.1 microsecond. It is not necessary to physically confine the gases within the arc passageway and, for many applications, either the electrodes or the insulating member are provided with a window-less aperture through which the generated light may be non-attenuatively transmitted outwardly from the arc discharge space and along a desired light path.

The foregoing and other objects and features of the present invention will be more clearly apparent from the following description, when taken in conjunction with the accompanying drawings, in which:

FIGURE 1 is an elevational view, partially broken away, of a vacuum ultraviolet spectrographic apparatus which advantageously embodies a structure in accordance with the present invention;

FIGURE 2 is a cross-sectional view taken along the lines 2—2 of FIGURE 1;

FIGURE 3 is a plot of a photographic density of a function of a wavelength corresponding to a microdensitometer trace of a spectroscopic photograph of the radiation produced by an apparatus of the type illustrated in FIGURE 2;

FIGURE 4 is a photographic reproduction of the spectroscopic plate from which the microdensitometer trace of FIGURE 3 was taken;

FIGURE 5 is a plot of photographic density as a function of the logarithm of relative total radial energy flux;

FIGURE 6 is a plot of the relative variation with wavelengths of the rate of change of the photographic density vs. the logarithm of total radial energy; and FIGURE 7 is a cross-sectional view of a further embodiment in accordance with the present invention which is particularly adapted for use as a general purpose high intensity flashing light source.

There is shown in FIGURES 1 and 2 a particular exemplary form of apparatus in accordance with the present invention which is especially useful in connection with vacuum ultraviolet spectrographic apparatus. In particular, FIGURE 1 illustrates one such spectrographic apparatus as comprising an elongate, substantially cylindrical, vacuum chamber 10 which contains near one end a conventional 600- or 1200-line per millimeter grating 12 and, near the other end, a conventional mechanism 14 for inserting photographic plate holders or photoelectric detectors into the vacuum chamber 10. The details of the spectrographic apparatus are not belabored herein since they are conventional and may, for example, be identical to an apparatus presently marketed by McPherson Instrument Corporation, 530 Main Street, Acton, Massachusetts, as their "Model 240 Vacuum Ultraviolet Combination Spectrograph and Scanning Monochromotor."

At its lower side as shown in FIGURE 1, the spectrographic apparatus has an angularly extending cylindrical tube 16 having at its outer end a flange portion 18 for vacuum tight mounting of a conventional slit selecting structure 20 and a radiation source indicated generally by the numeral 22. The slit selecting structure 20 normally contains a rotatably indexable table (not shown) which carries a number of spectrograph slits having slit widths ranging from .01 milimeter to about 1.0 millimeter. Light from the radiation source 22 is projected through a selected slit of structure 20 and therefrom along a light path which is coincident with the central axis 24 of the cylindrical tube 16. In accordance with conventional practice, the light from source 22 is propagated along the evacuated light path to impingement upon the grating 12. The grating variably refracts different wavelength components of the impinging radiation and, therefore, disperses such components as a function of wavelength. The conventional spectral dispersion is indicated diagrammatically by the dashed lines 26 and 28.

Lamp structure 22, as shown in FIGURES 1 and 2, includes a mounting flange 30 arranged for vacuum-tight coupling of the lamp in axial alignment with the axis 24 of the spectrograph light tube 16. Preferably, the mounting flange 30 is grounded as indicated at 32 and the other end of the lamp structure is connected by means of a coaxial connector 34 and a high tension cable 36 to a circuit arrangement capable of discharging electrical energy of from 50 joules to 300 joules into the lamp structure within approximately 10 microseconds. To that end the high voltage circuit includes a high potential direct current source 38 capable of supplying potentials from about 5 kv. up to about 30 kv. with the high voltage output terminal being connected through a current limiting resistor 40 to a high voltage storage capacitor 42 which has one end grounded. The other capacitor terminal is connected through a conventional ignitron switch 37 and coaxial cable 36 to the high voltage end terminal 62 of the lamp structure 22.

As best shown in FIGURE 2, the lamp mounting flange 30 has on its outer surface a cylindrical internally threaded collar 44 to which is threadably connected an elongate metallic sleeve 46 which forms the external wall of the light source device and serves also as a discharge current return path. The light source structure, per se, includes an elongate hollow insulator or dielectric structure such as a tube 48 having a relatively small bore or arc discharge passageway 50 extending axially therethrough. The mounting plate 30 has a central hole about 5/32" diameter in which there is press fit a tubular stainless steel insert 54 having an inside diameter of 7/64". The central aperture 52 extending through the insert 54 establishes a non-attenuative radiation transmission light path through which vacuum ultraviolet light as well as radiation of any other wavelength may emerge from the light source and be propagated towards the spectrograph grating 12. Additionally, the right hand end of the tubular insert 54 projects in close fitting relationship into the end of the arc discharge passageway 50 of the insulating tube 48 and forms one electrode of the plasma arc discharge which occurs within the passageway 50.

It will be observed that the passageway 50 communicates, through the tubular insert 54, with the relatively very large vacuum chamber of the spectrograph. Thus when used for spectrographic purposes the light source device 22 is internally evacuated and since it is coupled directly to the vacuum chamber of the spectrograph and no initial gas filling of the discharge path is required, no high speed differential pumping facility which is required for the operation of most conventional vacuum ultraviolet source is needed. The conventional vacuum pumps associated with the spectrograph vacuum chamber serve to at least partially evacuate the passageway 50 between successive arc discharges therein, so that immediately prior to each energization of the light source structure the arc discharge passageway 50 has an internal gas pressure of the order of a few microns of mercury or less. To prevent leakage of gas into the vacuum system the mounting flange 30 carries in a suitable groove a conventional O-ring 56 which seals against the end face of the arc tube 48. At the right hand end of the insulating tube 48, there is inserted a closely fitted second electrode 58 which is preferably integrally formed with a female electrical connector 60 adapted to mate with a plug 62. The outside diameter of the connector 60 is appropriately threaded to screw into an internally threaded high voltage insulating bushing 64. The bushing 64 preferably extends to the right hand end of the metallic sleeve 46 and at its other end fits over a reduced diameter portion 66 of the insulating arc tube 48. A coaxial connector fitting 68 is silver soldered to the right hand of the cylindrical tube 46 and forms an end wall against which bushing 64 abuts. Thus, when metallic sleeve 46 is screwed into the collar 44, elements 48 and 64 are tightly compressed between the mounting plate 30 and the coaxial connector 68 so that axial movement of the electrodes 54 and 58 is completely avoided.

High voltage cable 36 carries a conventional, internally threaded coaxial connector 34 which threads onto the male fitting 68. The braided outer conductor (not shown) of cable 36 is conventionally grounded to connector 34. The externally insulated center conductor 70 of the cable carries at its end a plug 62 adapted to seat in connector 60 so that an extremely low resistance coaxially shielded current path is provided from capacitor 42 to electrode 58. The further current path is through the arc discharge passageway 50 to electrode 54 from whence the current returns through the metallic sleeve 46 to the shield of the coaxial cable 36, which in turn is directly connected to the grounded storage capacitor terminal. Thus the current path is nearly optimum for lowest possible inductance.

In accordance with the concepts of the present invention, the arc discharge tube 48 is formed of a suitable insulating material which is capable of evolving large quantities of gas in the presence of an arc discharge. It has been found that materials such as Plexiglas, nylon and Teflon, are suitable for the member 48. Plexiglas has been used with great success and has the advantages of being a good insulating material and having high physical strength while at the same time being transparent to radiation in a major portion of the visible spectrum. It should be understood that there is a wide range of materials which are suitable for use as the internal walls of the arc discharge tube 48 and that the present invention is not limited to those specific preferred materials mentioned above. The various materials which have been found suitable and the criteria for selecting a suitable material are considered in more detail hereinafter.

The operation of the apparatus shown in FIGURES 1 and 2 is substantially as follows: Upon application of a sufficiently high voltage to the electrode 58 from the storage capacitor 42, discharge through the passageway 50 is initiated by a sliding spark along the wall of the passage 50 between the electrodes 58 and 54. Where the apparatus is used in connection with a high vacuum system, it is desirable that the electrode 58 intimately engage the walls of the discharge passage 50 so that the initial sliding spark along the wall of the evacuated passageway can develop. The sliding spark along the inside wall of the member 48 decomposes a minute amount of the wall material and releases a small amount of gas into the discharge passageway 50 where the gas is contained long enough to serve as a carrier of a powerful gas discharge between the electrodes 58 and 54. This powerful discharge of electrical energy in the passageway 50 results in evolution of additional quantities of gas from the walls of the passageway so that in a fraction of a microsecond, enough gas is released to provide an instantaneous pressure substantially in excess of one atmosphere in the passageway 50. This rapid pressurization and simultaneous dissipation of large quantities of electrical energy produces a high pressure high temperature plasma of a temperature between 15,000° K. to 60,000° K., depending on discharge conditions such as discharge energy, ringing frequency, and discharge passageway geometry. This gives rise to a powerful pulse of vacuum ultraviolet, ultraviolet, visible and infrared radiation emanating from the gas within the passageway.

As shown in FIGURE 2, the outer cylindrical metallic sleeve 46 serves as an electromagnetic shield enclosing the entire lamp structure for confining the electrostatic and magnetic fields which arise from the arc discharge within the passageway 50. In applications such as spectrographic purposes, the coaxial structure of the apparatus of FIGURE 2 and the completely enclosed outer shielding of the entire system is quite important in that it enables use of the light source structure in the immediate vicinity of high sensitivity electronic equipment (e.g., photomultiplier tubes and microvolt signal amplifiers) which would be entirely disrupted by the presence of high frequency noise emanating from an unshielded arc discharge. In addition, the metallic sleeve 46 serves to reinforce the structure physically so that the possibility of fragmentation of the arc tube 48 because of high internal gas pressure is reduced. Alternatively, the arc tube 48 may comprise a laminated structure having a high strength metallic outer cylinder and one or more cylindrically telescoped insulating material tubes surrounding the arc discharge passageway 50. Such an alternative structural arrangement permits the choice of a low strength gas evolving material for the immediate walls of the passageway 50 substantially independently of mechanical strength requirements. The necessary physical strength can in that manner be supplied by the outer cylindrically telescoped dielectric tube or tubes, it only being necessary to provide sufficient strength in the entire structure, including the outer metallic sleeve 46 to withstand the gas pressure instantaneously developed in the passageway 50.

The following materials and parameters were found to give good results in one practical application of the present invention as a light source for use in vacuum ultraviolet spectrographic equipment.

*Example I*

| | |
|---|---|
| Mounting plate 30, ¼" tk alum | 5" O.D. |
| Sleeve 46 | 1" O.D. |
| | 0.906 I.D. |
| Connector 34 | Type UG–21E/U. |
| H. V. cable 36 | Type RG–9B/U. |
| Positive electrode 54, stainless steel | 0.162 O.D. |
| | 0.109 I.D. |
| | ⅜" long. |
| Bushing 64, Plexiglas | 0.900 O.D. |
| | 3" long. |
| Arc tube 48, Plexiglas | 2½" long. |
| | 0.160 I.D. |
| | 0.900 O.D. |
| Collar 44 | ½" long. |
| | 1⅜" O.D. |
| Capacitor 42 | 0.8 μf. |
| Resistance 40 | 1 megohm. |
| H. V. source 38 | 15 kv. |

It is to be expressly understood that the foregoing tabulated component values and dimensions are given by way of example and are not intended to limit the scope of the present invention in any way.

One important feature of apparatus in accordance with the present invention is the great mechanical strength of the peripheral walls surrounding the arc discharge passageway 50. This can be achieved by choosing a laminated structure as described above and by selecting material of good mechanical strength. When Plexiglas (polymethylmethacrylate) is used for the arc tube 48 tensile strengths up to about 11,000 p.s.i. can be achieved. This compares very favorably with the average tensile strength of about 7000 p.s.i. of the quartz which is commonly used for high pressure gas discharge light sources. While sapphire has a substantially higher tensile strength than Plexiglas, it is extremely expensive in large diameter sizes and difficult to obtain. More important, of course, is the fact that sapphire and quartz would not serve as a gas evolving material for the internal walls of the arc discharge passageway 50. Thus, even if the arc tube 48 were formed of quartz or sapphire, it would require an internally laminated tube of gas evolving material. Furthermore, quartz and sapphire are brittle whereas Plexiglas is fairly ductile which is of advantage for withstanding shock. In addition, the impact strength of organic materials such as Plexiglas can be improved by design variations such as lamination and the like which design variations cannot readily be applied to non-machinable materials such as quartz, sapphire or glass.

In considering the radiation output characteristics of apparatus in accordance with the present invention, it is useful to consider briefly the physical problems involved in providing a thermal light source of higher radiance than those heretofore obtainable.

The term "thermal light source" as used here refers to the nature of the radiating light source plasma and shall indicate that the latter is in a state of near thermodynamic equilibruim. It should of course be realized that true thermodynamic equilibrium cannot be achieved in any electrically excited discharge plasma. Therefore the meaning of "thermal" in this connection means "close to thermodynamic equilibrium." In practice, this means that thermodynamic state variables characteristic of the plasma deviate no more than approximately 20% from those which would have been obtained had there been a true thermodynamic equilibrium.

The most powerful radiation sources heretofore known are to be found among thermal sources. Radiation from thermal light sources is governed by a few laws, the most basic of which is that the radiance from a plasma of temperature T and at wavelength λ cannot exceed the radiance of a "black body" at the same wavelength and of the same temperature. This limiting radiance is independent of the physical properties of material comprising the radiating plasma. Furthermore, the greatest radiation power (integrated over all wavelengths) which can be emitted from one square centimeter of surface of a thermal light source is equal to $\sigma \cdot T^4$, where $\sigma = 5.67 \cdot 10^{-12}$ watts/cm.$^2$ degrees$^4$ and T is in degrees Kelvin. The wavelength $\lambda_m$ of maximum radiance is related to temperature by Wien's law: $\lambda_m \cdot T = 0.28973$ cm. degrees. It is of practical interest in this connection to note that approximately 78% of the total emitted radiation power $(\sigma \cdot T^4)$ is of wavelength equal to or greater than $\lambda_m$.

The heat loss across a boundary surface is equal to $K \cdot \nabla T$ where K is the heat conductivity and $\nabla T$ the temperature gradiant. For a fully ionized plasma (temperature near 20,000 degrees Kelvin) heat conductivity K will increase almost as $T^{5/2}$. Temperature gradiant at some important boundary surface of the plasma will depend critically on the mechanical design of the passageway in which the discharge is contained. In the temperature ranges of present interest (10,000° K. and up) the energy loss by conduction across a boundary surface becomes negligible as compared to the energy lost from the plasma by radiation, $\sigma \cdot T^4$. The sum of both equals the energy production per unit element of length of the discharge passageway, $dR \cdot E^2$, where $dR$ is the electrical arc resistance per unit length of the plasma and $E^2$ is the square of the electric field strength.

As a consequence, a thermal light source of high plasma temperature can have very high efficiency of conversion of electrical energy into radiation of any wavelength. If we consider as "useful" radiation all radiation of wavelength $\lambda_m$ or greater, conversion efficiency can theoretically approach 78%, provided that the radiating plasma has opacity in excess of unity for wavelength greater than $\lambda_m$.

By actual spectral measurements, it has been determined that apparatus in accordance with the present invention produces a plasma having a spectral characteristic approximately corresponding to that of a black body having a temperature of 20,000° Kelvin. This latter temperature has been produced with an apparatus having the physical and electrical parameters specified in Table I. Adhering to those recommended design parameters and electrical circuit values will ensure long life of the apparatus. In addition, temperatures greatly in excess of 20,000° K. can be obtained at a sacrifice in operative lifetime of the replaceable arc tube 48 and the electrodes 54 and 58.

FIGURE 3 is a microdensitometer trace obtained from a photograph on Ilford "Q1" spectroscopic Schumann plates. Wavelength is plotted along the abscissa and photographic density along the ordinate. The microdensitometer to obtain FIGURE 3 from the spectra illustrated in FIGURE 4 was a Joyce-Loebl, Double Beam Automatic Recording Microdensitometer Mark IIIc. The spectrographic "Ilford, Q1" plate was mounted in the focal curve of the previously described McPherson spectrographic apparatus. An entrance slit width of 0.05 millimeter was chosen and a total exposure time (single flash) of approximately 5 microseconds was used. Photographic density (ordinate of FIGURE 3), is directly proportional to the logarithm of total incidence radiant energy flux (joules of radiant energy/cm.$^2$ plate area).

The proof of proportionality between radiant energy flux and the logarithm of photographic density was obtained by the following method. Because of the high reproducibility of the radiance afforded by the apparatus, calibrated relative radiant energy flux (on the photographic plate) can be obtained by making a series of spectra where, with a fixed entrance slit, different numbers of flashes are superimposed. An additional method is to vary the entrance slit width because radiant energy flux on the photographic emulsion is directly proportional to the slit width in a spectrograph as used in these techniques.

FIGURE 4 is a photographic reproduction of one plate produced in the foregoing manner. Wavelength on the entrance left is 800 A. and on the extreme right 2900 A. The four lower spectra are calibration spectra for the purposes discussed above. FIGURE 5 shows one example of a plot of photographic density as a function of the logarithm of relative total radiant energy flux. FIGURE 6 is a plot of the relative variation with wavelength of the rate of change of the photographic density versus the logarithm of total radiant energy. This slope is commonly referred to as the "γ" factor of the emulsion. The five upper spectra show the absorption of molecular oxygen in the indicated wavelength range (dark portions of the plate indicate little or no absorption). The molecular bands to the right of the center are the well-known Schumann-Runge bands, which converge to a wavelength $\lambda = 1759$ A. The continuum adjacent to the Schumann-Runge bands and extending toward the shorter wavelengths (towards the left in FIGURE 4) is identifiable as the Schumann-Runge disassociation continuum of oxygen. Going further toward shorter wavelengths, a region of relatively large transmittance of molecular oxygen, interrupted by a large number of relatively narrow absorption bands can be observed. All the absorption spectra were obtained by filling the vacuum chamber of the McPherson spectrographic apparatus (FIGURE 1) at different low pressures. The total absorbing path length was 4.43 meters. Oxygen pressures were, considering the spectra from the top toward the bottom 0.006, 0.1, 1.0, 3.0, and 10 torr. The absorption spectra (the 5 upper spectra in FIGURE 4) are a good demonstration of the usefulness and advantages of the apparatus for spectroscopic research. FIGURES 5 and 6 demonstrate the value of the apparatus as a continuous calibration source or radiance standard in the vacuum ultraviolet range.

Reproducibility of light emission of the subject apparatus has been demonstrated photoelectronically over a wavelength from 1200 A. to 6000 A., using an RCA 1P28 photomultiplier tube mounted near the focal curve of the McPherson spectrograph behind an 0.01 millimeter exit slit. In these measurements a matching entrance slit of 0.01 millimeter has been used in the slit selector 20. For wavelengths below 4000 A. a glass window coated with sodium salicylate was inserted in front of the 1P28 phototube to convert the vacuum uv. radiation by fluorescence by a wavelength range by which the phototube was responsive. That technique for detection of vacuum uv. radiation by means of a sodium salicylate plate in conjunction with conventional photoelectric detectors is well known. Sodium salicylate is excited to fluorescence near 4000 A. by incident radiation of wavelengths lower than 3000 A. In all these experiments a 0.1% transmission filter was used to attenuate light either transmitted directly (λ>3000 A.) or fluorescent radiation from the sodium salicylate by the foregoing measurements radiance reproducibility of better than ±5% variation from the average value has been demonstrated.

Having established reproducibility, temperature of the source was measured as follows. The photographed spectrum which is completely free of spectral lines (see for example the right-hand side of the spectra in FIGURE 4) suggests that the radiation characteristics of the source during most of the discharge approaches that of a black body of a thus far indeterminate temperature. To determine this temperature and to check the validity of the above assumption, the absolute radiance of the source was measured at wavelengths ranging from 4000 A. to 6000 A. in 100 A. steps. Entrance and exit slits were chosen as 0.01 millimeter, corresponding to a covered bandwidth of approximately 0.08 A. From each absolute radiance measurement (peak radiance) a temperature can be calculated once black body characteristics have been assumed. If the black body assumption is correct then each absolute radiance measurement, irrespective of wavelength, has to be compatible with one and only one temperature. This temperature is then also the correct radiation temperature of the plasma. Using a light source having the physical and electrical parameters specified in Table I, a total of 21 measurements has indicated a plasma temperature of $$T = 18,800° K. \pm 300° K.$$

where ±300° K. is the probable error.

To measure absolute radiance, the oscillographically recorded photocurrents were compared to those obtained from a chopped calibrated tungsten ribbon lamp, using in both cases identical optics, except for a carefully calibrated neutral transmission filter employed to bring the photocurrents corresponding to the two separate signals into the same magnitude range.

From the above discussed measurements, persons skilled in the spectroscopic arts will recognize that apparatus in accordance with the present invention is particularly useful and advantageous as a radiation standard of high and reproducible radiance in the extreme ultraviolet, and the vacuum ultraviolet spectral regions.

From consideration of FIGURE 3, it will be appreciated that apparatus in accordance with the present invention produces a plasma having a temperature of approximately 1900° Kelvin if operated as specified in Table I, so that the plasma produces radiation closely comparable to that of a black body radiator, and having most of its energy in the ultraviolet regions of the spectrum. Moreover, it has been determined that the output radiation is not a series of separate spectral lines. Rather in the spectral region from about 1000 Angstroms upward the apparatus produces substantially a spectral continuum. Further, from experimentally obtained spectrographic data concerning the relative spectral photon flux distribution it appears, when substantially higher discharge energy (approximately 500 joules) is used instead of the recommended value (58 joules) of Table I that apparatus can be constructed in accordance with the present invention which will produce even better and more continuous emission of higher intensities across the ultraviolet and visible wavelength ranges. One such set of experimental data has given a relative spectral radiant energy distribution closely approximating that of a black body radiator having a temperature of 62,000° Kelvin.

In FIGURE 7, there is illustrated a further embodiment in accordance with the present invention which is arranged for general purpose use as a flashing light source rather than for spectrographic purposes. The apparatus illustrated in FIGURE 7 is cylindrically symmetric (i.e., a figure of revolution) and is therefore adequately illustrated by the single cross-sectional view. In this embodiment, the arc discharge passageway is an elongated annular space 84 provided between an inner cylindrical Plexiglas member 86 and a hollow outer member 88. The inside diameter of the arc tube member 88 is, in this embodiment, about 0.030" larger than the outside diameter of member 86 so that the arc discharge passageway 84 has a radial width of about 0.015". Energizing potential is applied longitudinally across the annular passageway 84 by means of a first electrode member 90 and a second electrode member 92 disposed at opposite ends of the arc discharge passageway. The first electrode 90 is again a figure of revolution and comprises a cylindrical collar electrode 94, a radially extending flange portion 96 and an exhaust tube 98 which may be of any convenient length. The outer end of the exhaust tube 98 may be coupled to a vacuum chamber (not shown) or in the event that the light source is carried on an aircraft or space vehicle it may simply be exposed to the high altitude, low pressure environment of the vehicle. The collar-like electrode portion 94 is press fit into the Plexiglas arc tube member 88 and preferably has an inside diameter substantially equal to the inside diameter of the arc tube 88. By that arrangement, the discharge passageway 84 is provided with an annular opening 85 extending to the interior of the exhaust tube 98 so that gases generated within the arc discharge passageway 84 may flow therefrom in an unimpeded manner. The second electrode 92, which is preferably the negative electrode of the system, includes a cup-shaped electrode portion 100 and a cylindrical stud portion 102 which has its outer end threaded for convenient connection of a high potential line thereto from a high voltage source (not shown). The cylindrical Plexiglas member 86 which forms the inside walls of the annular discharge passageway 84 is press fit into the cup-shaped portion 100 of electrode 92 so that the inside edges of the electrode portion 100 are disposed in intimate association with the outside diameter of the Plexiglas member 86. This close fitting relationship is important, when the apparatus is used in a vacuum environment, in that the intimate association of the negative electrode 100 and the Plexiglas walls of passageway 84 enables a sliding spark to be initiated along the inside wall of the passageway. The contiguous sliding spark then operates to evolve a sufficient quantity of gas within the passageway 84 so that a high current discharge through the passageway takes place within a fraction of a microsecond. The negative electrode 92 is held in place by a circular Plexiglas plate 104 which is provided with a recess for receiving the cup-shaped portion 100 of the electrode and a central aperture through which the stud portion 102 extends. Near its peripheral edge, the plate 104 has a plurality of circularly spaced holes 106 through which insulative tension members (not shown) may extend to a plurality of corresponding apertures 108 at the outer edge of electrode 90. Thus, by means of appropriate tension members, electrode 90 is firmly secured relative to the plate 106 and the two members are sealed to the cylindrical arc tube 88 by conventional O-rings 110 and 112 disposed in appropriate grooves in the flange portion 96 and the plate 104.

The operation of the apparatus shown in FIGURE 7 is essentially the same as that of the apparatus of FIGURE 2 as described heretofore. The only essential difference of the apparatus of FIGURE 7 is that the arc tube 88 is formed of a material (preferably Plexiglas) which is highly transmissive in the visible wavelength ranges. Accordingly, the structure may be mounted on an aerospace vehicle to serve as a flashing beacon light with the high intensity visible radiation emanating radially outward, through the member 88, in all directions. Additionally, if so desired, the structure illustrated in FIGURE 7 may be used as an ultraviolet source by cutting a radially extending slot 114 through the arc tube 88. The slot may be small enough so that it does not appreciably effect the instantaneous pressure built up within the discharge passageway 84 and, for example, may have a width of only a fraction of a millimeter in the case where it is used as a spectrographic radiation source.

While the various embodiments in accordance with the present invention have been described as using organic materials such as Plexiglas, Teflon and nylon, it should be expressly understood that the present invention is not limited to those specific materials but that any one of a wide range of arc responsive gas evolving materials may be used. Where the apparatus is to be used as a vehicle beacon light as described above in connection with FIGURE 7, the hollow cylindrical arc tube 88 of course should be a light transmissive material. However, there is no requirement that the inside cylindrical member 86 be transparent. It may comprise any one of a great variety of gas evolving materials or may be a laminated structure such as a ceramic rod with a nylon or Plexiglas sleeve closely fitted thereover. Furthermore, it is obvious that only one of the arc confining walls has to consist of gas evolving material. It has been found that the following specific materials are useful for the gas evolving walls of the arc discharge passageway 50 of the apparatus illustrated in FIGURE 2: polymethylmethacrylate (Plexiglas), polyhexamethylene (nylon), polytetrafluoroethylene (Teflon), polyvinylchloride (vinylite QYNA), polyethylene (e.g., DE–3401), and ethylcellulose (e.g., Lumarith 22361). The foregoing materials are listed by way of example only. It should be expressly understood that the present invention is not limited to the particular materials mentioned or to any one of them.

While the present invention has been described with reference to certain specific embodiments only, it will be clear to those skilled in the art that it is not so limited but is susceptible of various changes and modifications without departing from the spirit and scope of the concepts thereof.

The embodiments of the invention in which an exclusive property or privilege is claimed are defined as follows:

1. In combination:
   a pair of spaced electrodes;
   circuit means for applying potential between said electrodes to produce arc discharges therebetween with the time between successive discharges being relatively long as compared to the time duration of a given discharge;
   insulating means extending from one of said electrodes to the other and defining a passageway in which said arc discharges occur;
   said insulating means having passageway wall portions which include a gas evolving substance which is characterized in that the gases released therefrom, when heated by intense electrical discharge therethrough, emit radiation substantially corresponding to that of a black body having a temperature of the order of at least 18,000 degrees Kelvin;
   and evacuation means to provide a pressure substantially lower than atmospheric in said passageway prior to each successive arc discharge.

2. In an apparatus for generating pulses of light energy:
   a pair of spaced electrodes;
   circuit means for applying electrical potential between said electrodes to produce short time duration arc discharges therebetween with the time between successive discharges being relatively long as compared to the time duration of a given arc discharge;
   insulating means extending from one of said electrodes to the other and defining an arc discharge passageway in which said arc discharges occur;
   said insulating means having passageway wall portions which include an electric arc responsive gas-evolving substance which is characterized in that the gases released therefrom, when heated by intense electrical discharge therethrough, emit radiation substantially corresponding to that of a black body having a temperature of the order of at least 18,000 degrees Kelvin, so that during each successive arc discharge said gases are pressurized within said passageway to temporarily provide a high temperature light emitting plasma therein;
   and evacuation means for exhausting the evolved gases from said passageway to provide a pressure substantially lower than atmospheric therein prior to the next successive arc discharge.

3. An apparatus in accordance with claim 1 in which said evacuation means comprises a vacuum chamber having a relatively very large volume as compared to that of said passageway, and a gas duct communicating between said passageway and said vacuum chamber.

4. In an optical frequency radiation source:
   a pair of spaced electrodes;
   an elongate hollow dielectric member peripherally defining a passageway in which an electric arc occurs between said electrodes;
   means for partially evacuating said passageway to pressures substantially lower than atmospheric prior to each successive electric arc discharge between said electrodes;
   means defining an aperture for substantially non-attenuative transmission of radiant energy outwardly from said member;
   with said dielectric member including an electric arc responsive substance which is particularly characterized by evolution of gaseous arc products when subjected to contiguous electric arc discharge and which is further characterized in that said gaseous arc products when heated by intense electrical discharge therethrough emit optical frequency radiation having a spectral distribution approximating that of a black body radiator.

5. In an apparatus for generating short duration high intensity pulses of light energy:
   a pair of spaced electrodes;
   low inductance circuit means including a high capacitance condenser for repetitively producing between said electrodes arc discharges which individually involve dissipation of fifty to several hundred joules of electrical energy within time durations of a few microseconds;
   a dielectric member extending between said electrodes and defining an arc discharge passageway therebetween;
   and means to exhaust arc products from said passageway during the time intervals between successive discharges for evacuating said passageway to pressures substantially lower than atmospheric prior to each successive discharge;
   with said dielectric member including a gas evolving organic composition responsive to the heating action of contiguous electrical arc discharge to release copious quantities of gaseous arc discharge products wihtin said passageway in times substantially less than a microsecond, whereby during each successive discharge said passageway is filled with ionized gases which are additionally heated and pressurized by electrical discharge therethrough in a manner to temporarily provide within said passageway a light emitting plasma having temperature of the order of at least about 20,000° K. and adapted to emit light energy having a spectral energy distribution approximating that of a black body radiator of about the same temperature.

6. A device for production of radiant energy comprising:
   a cylindrical body formed of a solid, arc responsive, gas evolving material which is characterized in that the gases evolved therefrom, when heated by electrical discharge, emit radiation substantially corresponding to that of a black body having a temperature of the order of at least 18,000 degrees Kelvin;

said body having end faces normal to the axis of symmetry and an elongated passageway extending axially through said faces;

first and second electrodes of substantially the same size as said passageway extending into the same from each end face and having their inner ends in relatively far spaced opposition to form an elongated discharge gap;

circuit means including a high capacitance low inductance condenser for applying a sufficient potential to initiate an arc discharge along said passageway between said electrodes;

one of said electrodes having an axial aperture extending therethrough for permitting discharge of evolved gases from said passageway and for providing a substantially non-attenuative light path through which radiation within said spectral continuum emerges from said body; and a substantially cylindrical shield member enclosing said body and connected to one of said electrodes for confining the electromagnetic fields which arise from said arc discharge.

7. In a spectrographic apparatus:

an evacuated chamber enclosing a light path along which it is desired to project a beam of radiant energy having substantial intensities at substantially all wavelengths in the vacuum ultraviolet and ultraviolet spectral region;

a substantially cylindrical member having an axially extending passageway aligned with said light path, said member being formed of a dielectric material adapted to evolve gases when subjected to electrical discharge along said passageway, with said material being characterized in that the gases released therefrom, when heated, emit radiation of approximately uniform intensity across said spectral range;

means for providing an electric arc discharge longitudinally of at least a major portion of said passageway;

said means including first and second electrodes disposed in spaced apart relationship within said passageway, with said first electrode having a central aperture communicating between said passageway and said evacuated chamber for exhausting the gases evolved from said material into said evacuated chamber and for substantially non-attenuatively transmitting radiant energy within said spectral range along said light path.

8. In combination:

a pair of spaced electrodes;

circuit means for applying potential between said electrodes to produce arc discharges therebetween with the time between successive discharges being relatively long as compared to the time duration of a given discharge;

insulating means extending from one of said electrodes to the other and defining a passageway in which said arc discharges occur;

said insulating means having passageway wall portions which include a gas evolving substance which is characterized in that the gases released therefrom, when heated by intense electrical discharge therethrough, emit radiation substantially corresponding to that of a black body having a temperature of the order of at least 18,000 degrees Kelvin;

and evacuation means for reducing the gas pressure in said passageway to a few millimeters of mercury prior to each successive arc discharge.

References Cited by the Examiner
UNITED STATES PATENTS

| | | | |
|---|---|---|---|
| 2,667,061 | 4/1954 | Wilson | 315—111 |
| 2,683,235 | 7/1954 | Roloson | 313—231 |
| 2,889,480 | 6/1959 | Soulary | 315—111 |
| 3,153,169 | 10/1964 | Bauer | 313—161 |

JAMES W. LAWRENCE, *Primary Examiner.*

GEORGE N. WESTBY, *Examiner.*

S. SCHLOSSER, *Assistant Examiner.*